United States Patent
Gentili et al.

(10) Patent No.: US 11,511,675 B2
(45) Date of Patent: Nov. 29, 2022

(54) LADDER CARRYING DEVICE FOR A VEHICLE

(71) Applicant: GENTILI TECHNOLOGY EQUIPMENT S.R.L., Cesenatico (IT)

(72) Inventors: Aldo Gentili, Cesenatico (IT); Ernesto Gentili, Cesenatico (IT)

(73) Assignee: GENTILI TECHNOLOGY EQUIPMENT S.R.L.

(*) Notice: Subject to any disclaimer, the term of this patent is extended or adjusted under 35 U.S.C. 154(b) by 0 days.

(21) Appl. No.: 17/151,740

(22) Filed: Jan. 19, 2021

(65) Prior Publication Data

US 2021/0253033 A1 Aug. 19, 2021

(30) Foreign Application Priority Data

Jan. 20, 2020 (IT) .......................... 102020000000952

(51) Int. Cl.
*B60R 9/048* (2006.01)

(52) U.S. Cl.
CPC .................... *B60R 9/0485* (2013.01)

(58) Field of Classification Search
CPC ..... B60R 9/0485; B60R 9/0423; B60R 9/042; B60R 9/04; B60R 2011/004; B60R 9/045;

(Continued)

(56) References Cited

U.S. PATENT DOCUMENTS

| 5,622,299 A | * | 4/1997 | Berard | ................. B60P 3/062 |
| | | | | 224/403 |
| 5,850,891 A | * | 12/1998 | Olms | ................. B60R 9/0423 |
| | | | | 224/310 |

(Continued)

FOREIGN PATENT DOCUMENTS

| EP | 927664 A1 | * | 7/1999 | ........... B60R 9/0423 |
| EP | 796763 B1 | * | 7/2000 | ........... B60R 9/0423 |

(Continued)

OTHER PUBLICATIONS

EP 0796763 B1 Google Translation, Ballez, Jul. 5, 2000 (Year: 2000).*

(Continued)

*Primary Examiner* — Nathan J Newhouse
*Assistant Examiner* — Matthew T Theis
(74) *Attorney, Agent, or Firm* — Ware, Fressola, Maguire & Barber LLP (57) ABSTRACT

A ladder carrying device for a vehicle is equipped with a frame element (3) assigned, in its operative conditions (O) to be fixed above the vehicle (V). This frame element (3) is connected to a support member (9) for at least one ladder (S). The frame element (3) is provided with at least two longitudinal edges (13) at least approximately or substantially parallel to a longitudinal axis of the vehicle (V) and mutually and rigidly connected by at least one transversal element (15) a portion of which interposed between, and distant from, said longitudinal edges (13) carries at least one longitudinal stationary pivot (19) connected to a first end of a swinging body 21 whose opposite and second end is connected, by means of a longitudinal mobile pivot (23), to an oscillating element (25) connected to the support member (9).

10 Claims, 10 Drawing Sheets

(58) Field of Classification Search
CPC ......... B60R 9/08; B60R 9/048; B60P 3/1025;
B60P 3/1016; E06C 5/24
USPC .......................................................... 224/553
See application file for complete search history.

(56) References Cited

U.S. PATENT DOCUMENTS

| | | | |
|---|---|---|---|
| 7,427,183 B2* | 9/2008 | Stabeno | B60P 3/122 |
| | | | 414/483 |
| 7,549,831 B2* | 6/2009 | Hendley | B60R 9/0423 |
| | | | 224/310 |
| 10,189,418 B2* | 1/2019 | Willis | B60R 9/0423 |
| 2005/0079035 A1 | 4/2005 | Knez | |
| 2006/0185933 A1* | 8/2006 | Thibault | E06C 5/02 |
| | | | 182/127 |
| 2009/0140021 A1 | 6/2009 | Richter et al. | |
| 2018/0244208 A1 | 8/2018 | Willis | |

FOREIGN PATENT DOCUMENTS

| | | | |
|---|---|---|---|
| EP | 2 977 268 A1 | 1/2016 | |
| FR | 2 680 736 A1 | 3/1993 | |
| GB | 2468660 A * | 9/2010 | ............. B60R 9/042 |
| WO | 2012/044280 A1 | 4/2012 | |
| WO | 2014/134712 A1 | 9/2014 | |

OTHER PUBLICATIONS

EP 0927664 A1 Google Translation, Merigot, Jul. 7, 1999 (Year: 1999).*
Bibliographic data including translation of the abstract in the French language into the English language, FR 2 680 736 A1, 1 page.
Search Report and Written Opinion by the Italian Patent Office, IT 20200000000952, 7 pages.

* cited by examiner

LADDER CARRYING DEVICE FOR A VEHICLE

BACKGROUND

The present invention relates to the sector concerning vehicles and operating means and in particular it refers to a ladder carrying device for a vehicle such as a truck, van, wagon, trailer trolley and in general for any type of car or vehicle assigned for also transport of ladders for example of the telescopic type with rungs.

Different types of ladder carriers are known that can be applied to the roof of a truck or van, from the simplest ones, similar to roof-racks with attachments for the ladder, to the more complex ones that facilitate the loading and unloading of the ladder.

A disadvantage of the simpler known ladder carriers consists in the fact that they require considerable physical effort by the user and in the fact that, without providing any guide to the ladder movement, they can favor collisions and damage or injuries to objects and bystanders caused by the ladder during its handling.

A disadvantage of known ladder carriers capable of guiding and facilitating the loading and unloading movements of the ladder consists in the fact that they provide insufficient help and/or are very complex, expensive and heavy.

SUMMARY

An object of the present invention is to propose a ladder carrying device for a vehicle that allows the ladder to be moved parallel to itself and to rotate it, or vice versa, to facilitate the ladder loading and unloading as much as possible and to place it in its conditions of removal from and storing in a support of the device, in an almost vertical position, approximately corresponding to that of use, saving the operator from manual rotations for orientation in said use condition.

Another purpose is to propose a device that can be operated manually or equipped with motors for partially or fully automatic operation.

A further object is to propose a device which can be easily installed on almost all trucks, vehicles and cars, pre-arranged and not pre-arranged, and adaptable to ladders of different types and sizes.

Prior art documents: US 2009/140021 A1 (Richter Thomas [US] et al), US 2018/244208 A1 (Willis Thomas M [US]), EP 2 977 268 A1 (Knaack LLC [US]); WO 2014/134712 A1 (Ranger Design Inc [CA]), WO 2012/044280 A1 (Levi Avraham Y [US]), FR 2 680 736 A1 (Surirey Jagou [FR]) refer to a ladder carrying device comprising features known in the art.

BRIEF DESCRIPTION OF THE DRAWINGS

The characteristics of the invention are highlighted below with particular reference to the accompanying drawings in which.

DETAILED DESCRIPTION

With reference to FIGS. 1-14, numeral 1 indicates the device object of the present invention.

Figures 1, 2:
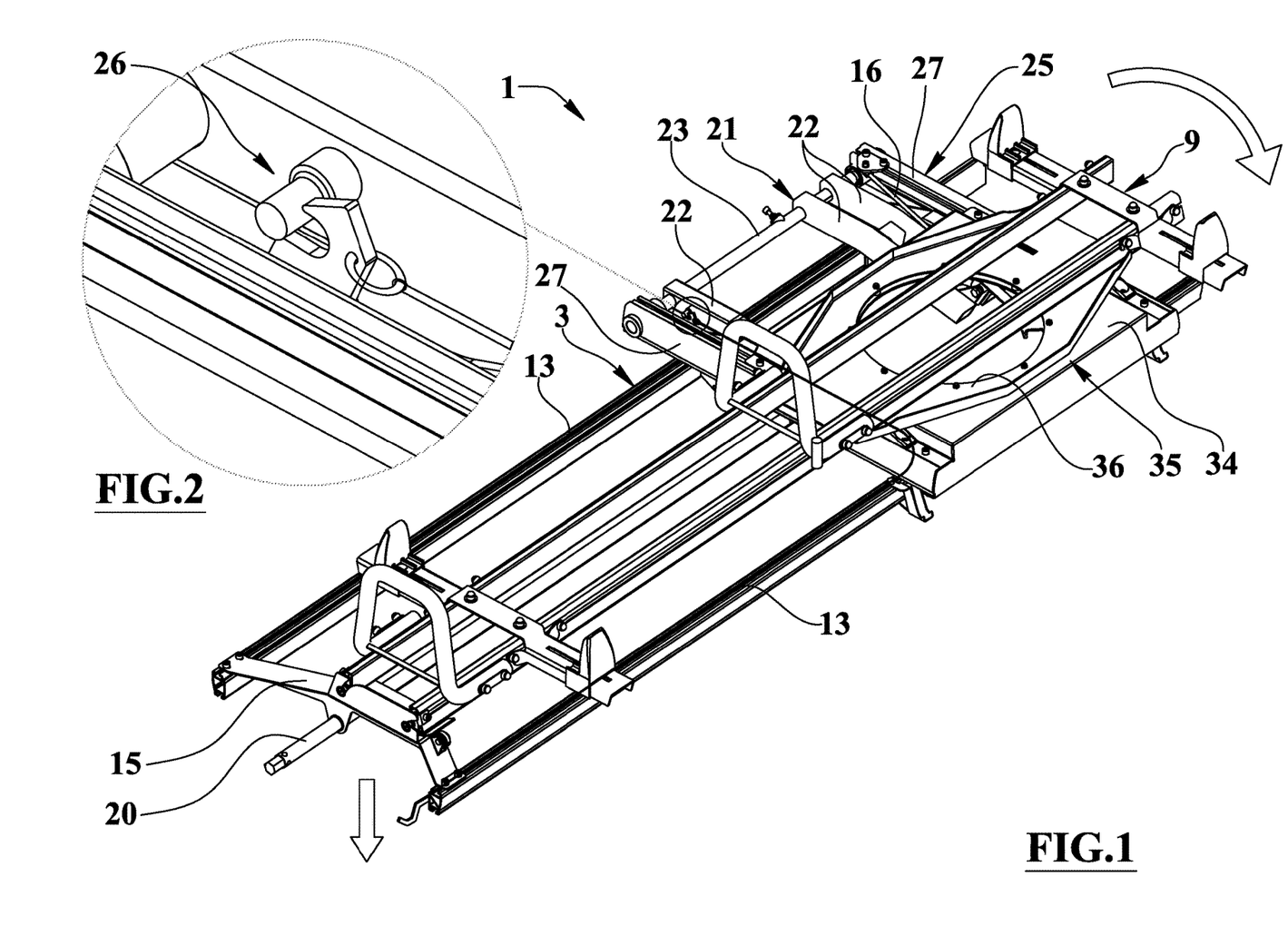
FIG. 1 illustrates an axonometric view of the ladder carrying device for a vehicle, object of the present invention, in a condition corresponding to ladder transport on the vehicle.
FIG. 2 illustrates an enlarged axonometric view of a detail of FIG. 1.
Figures 3, 6:
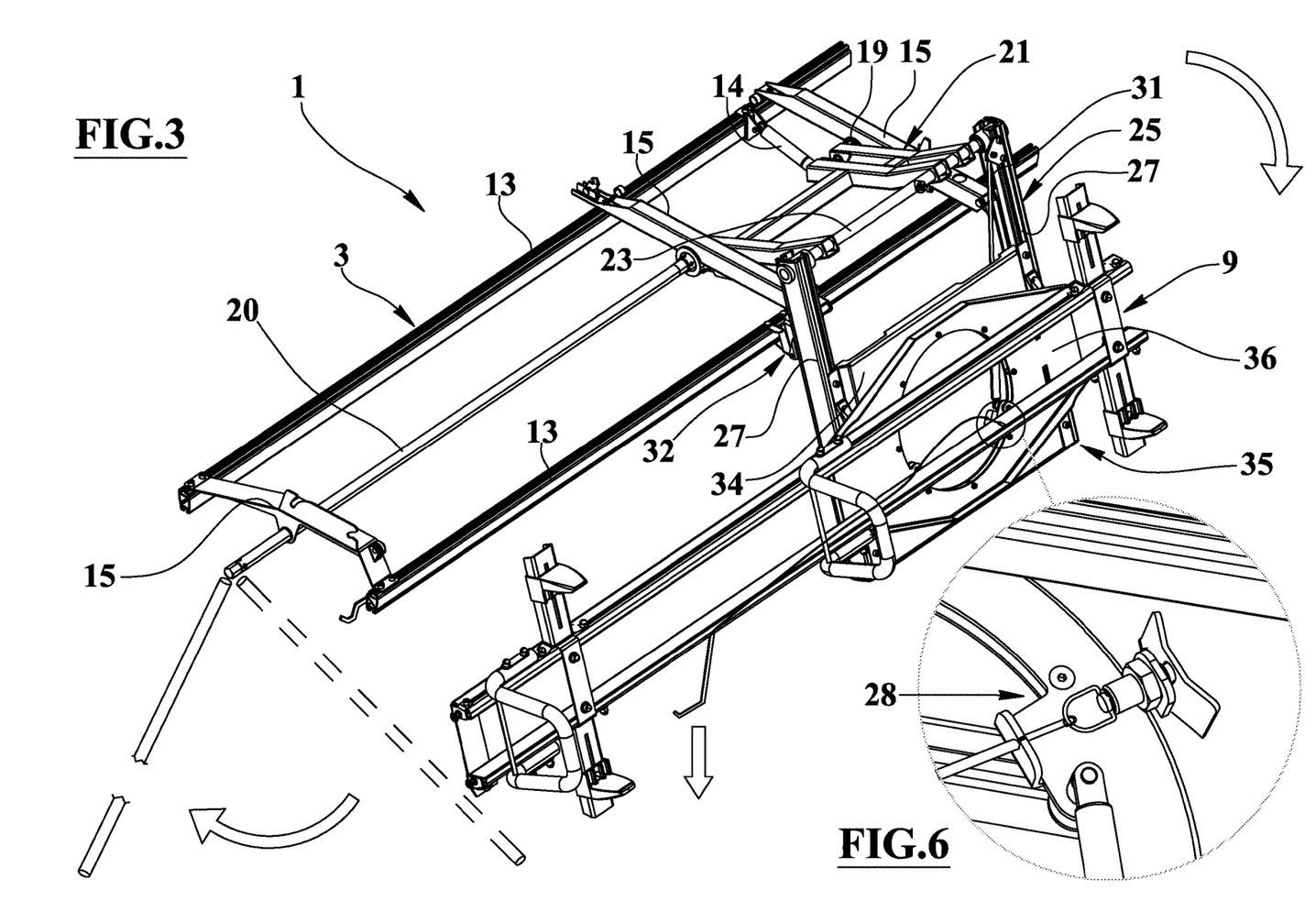
FIG. 3 illustrates a view of the device in a condition corresponding to that of partial descent of the ladder from the vehicle.
FIG. 6 illustrates an enlarged axonometric view of a detail of FIG. 3.
Figure 4:
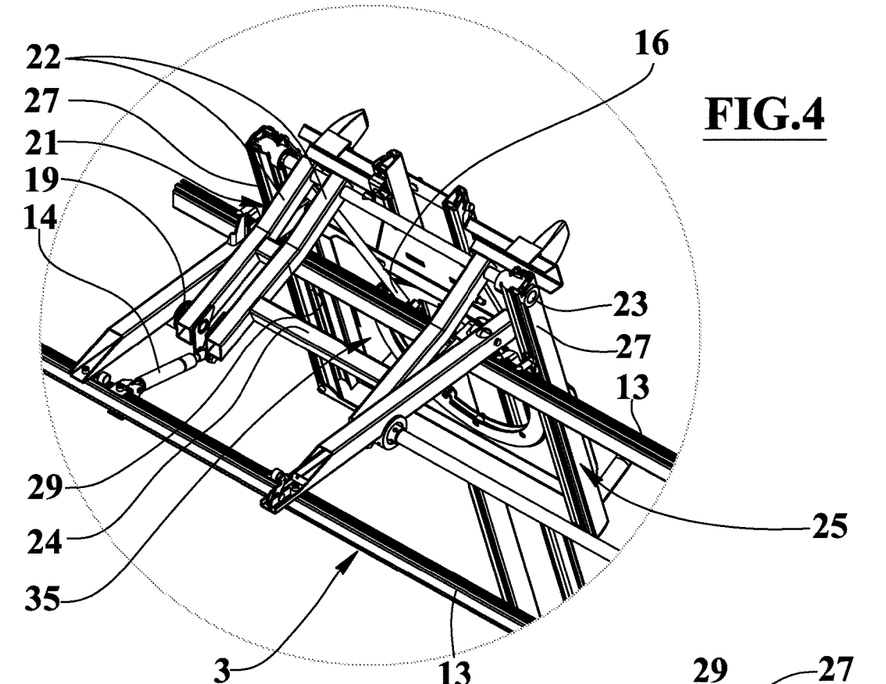
FIG. 4 illustrates a view of an enlarged detail of FIG. 3 from a first point of view.
Figure 5:
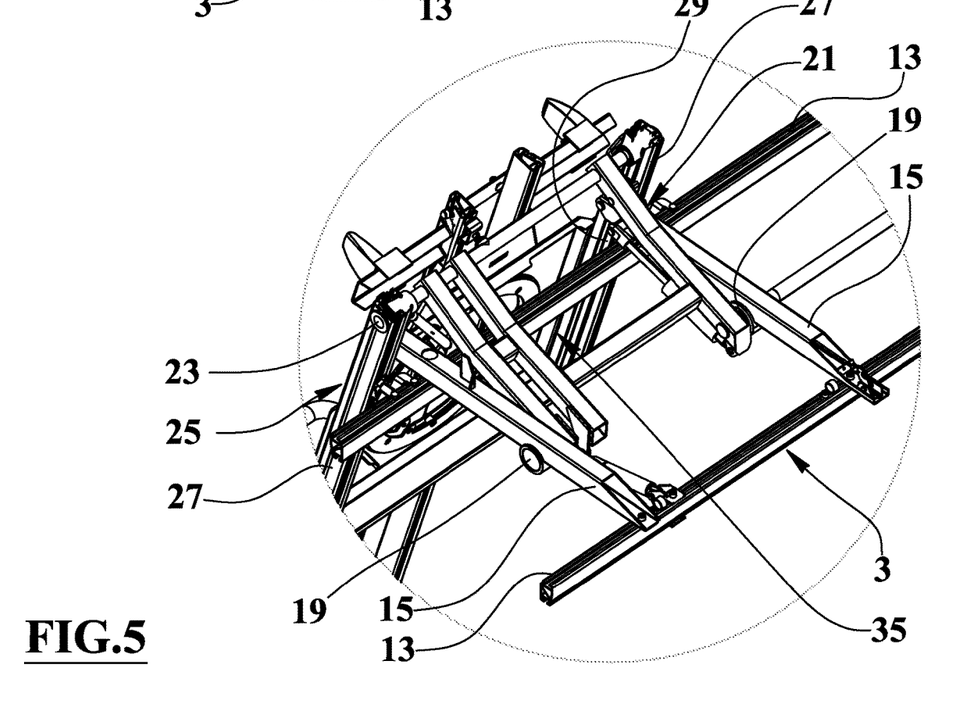
FIG. 5 illustrates a view of an enlarged detail of FIG. 3 from a second point of view.
Figure 7:
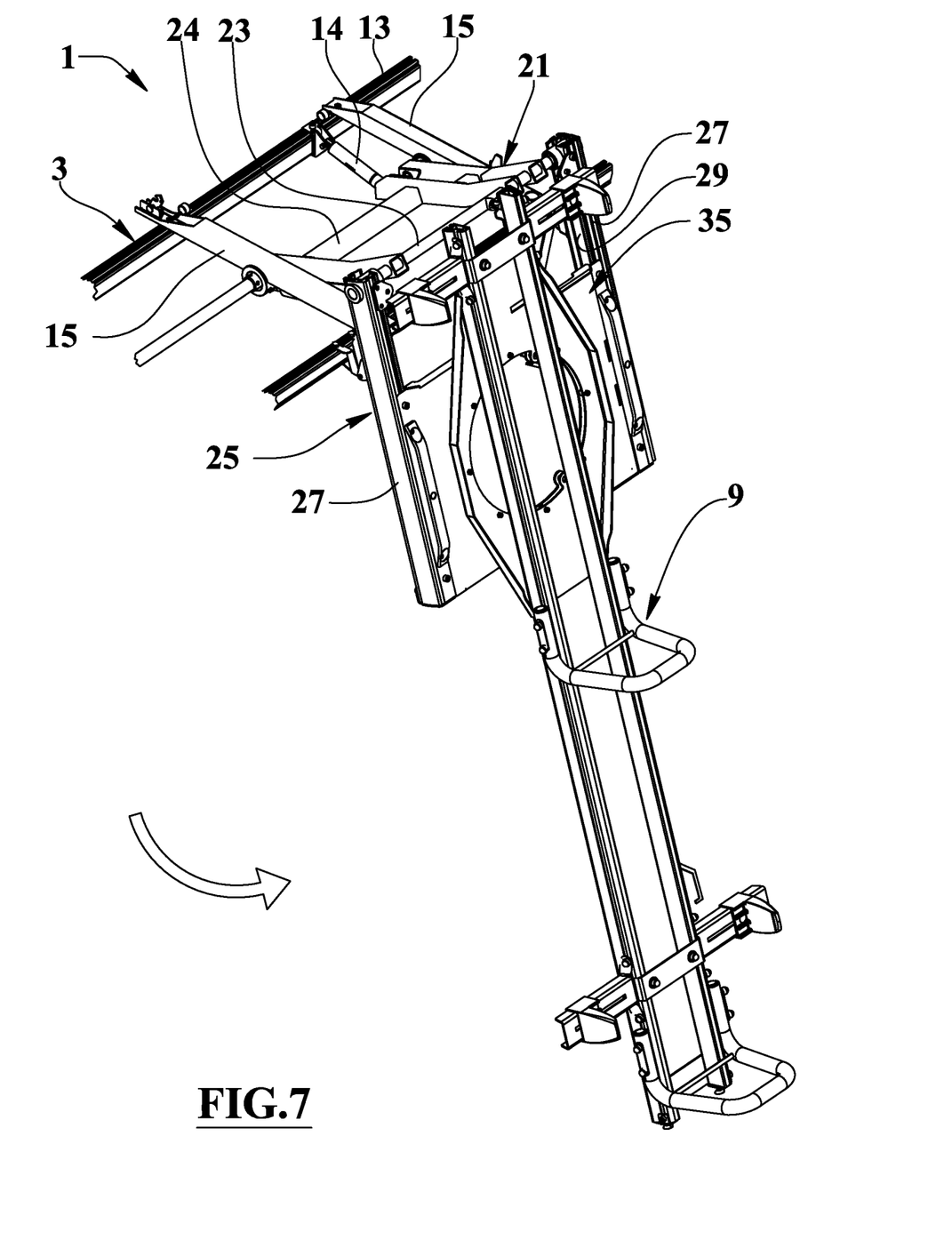
FIG. 7 illustrates a view of the device in a condition corresponding to that of removing the ladder from the vehicle or storing the ladder.
Figures 8, 9:
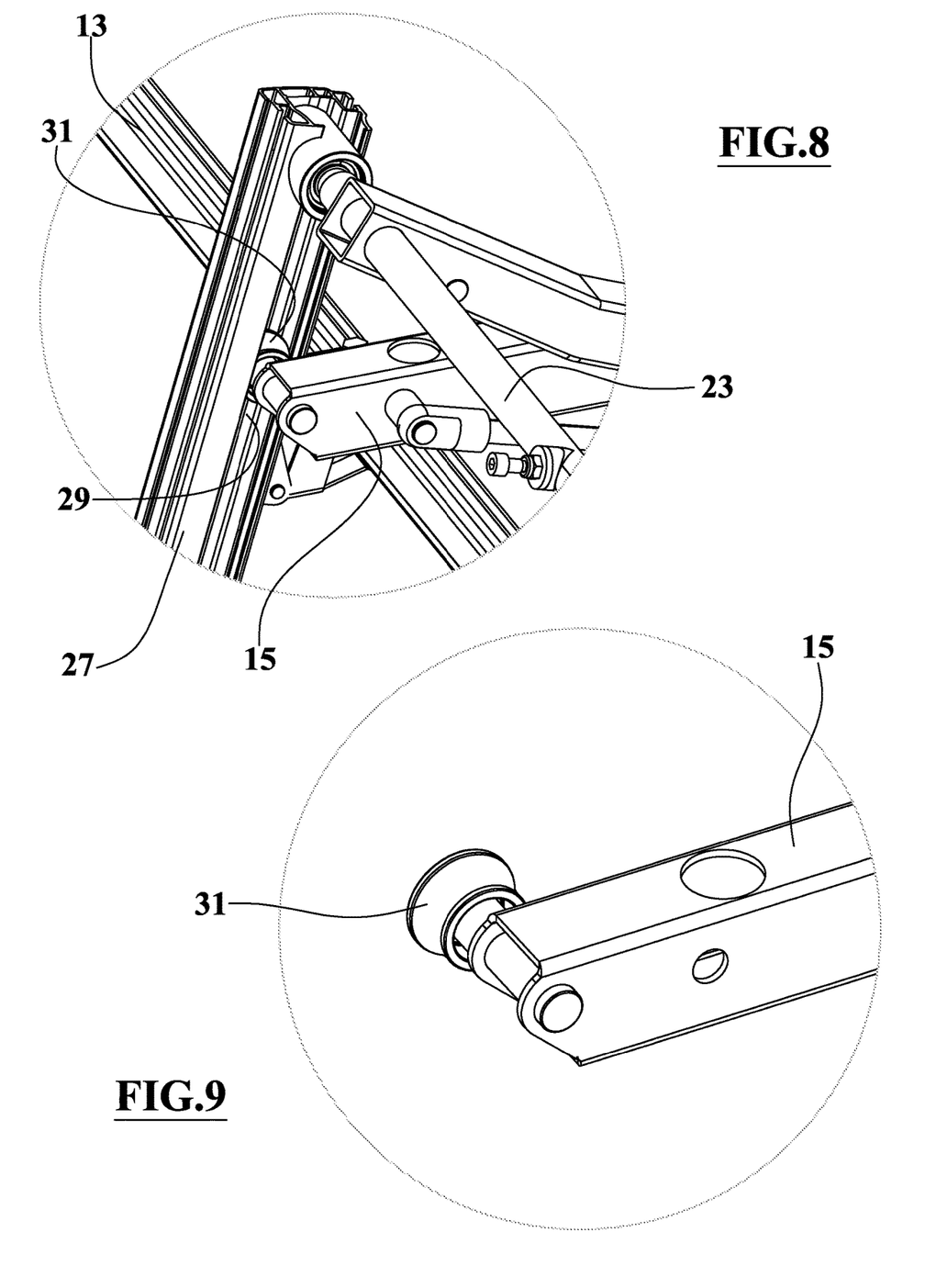
FIG. 8 illustrates an enlarged view of details of FIG. 7.
FIG. 9 illustrates another enlarged view of details of FIG. 7.
Figure 10:
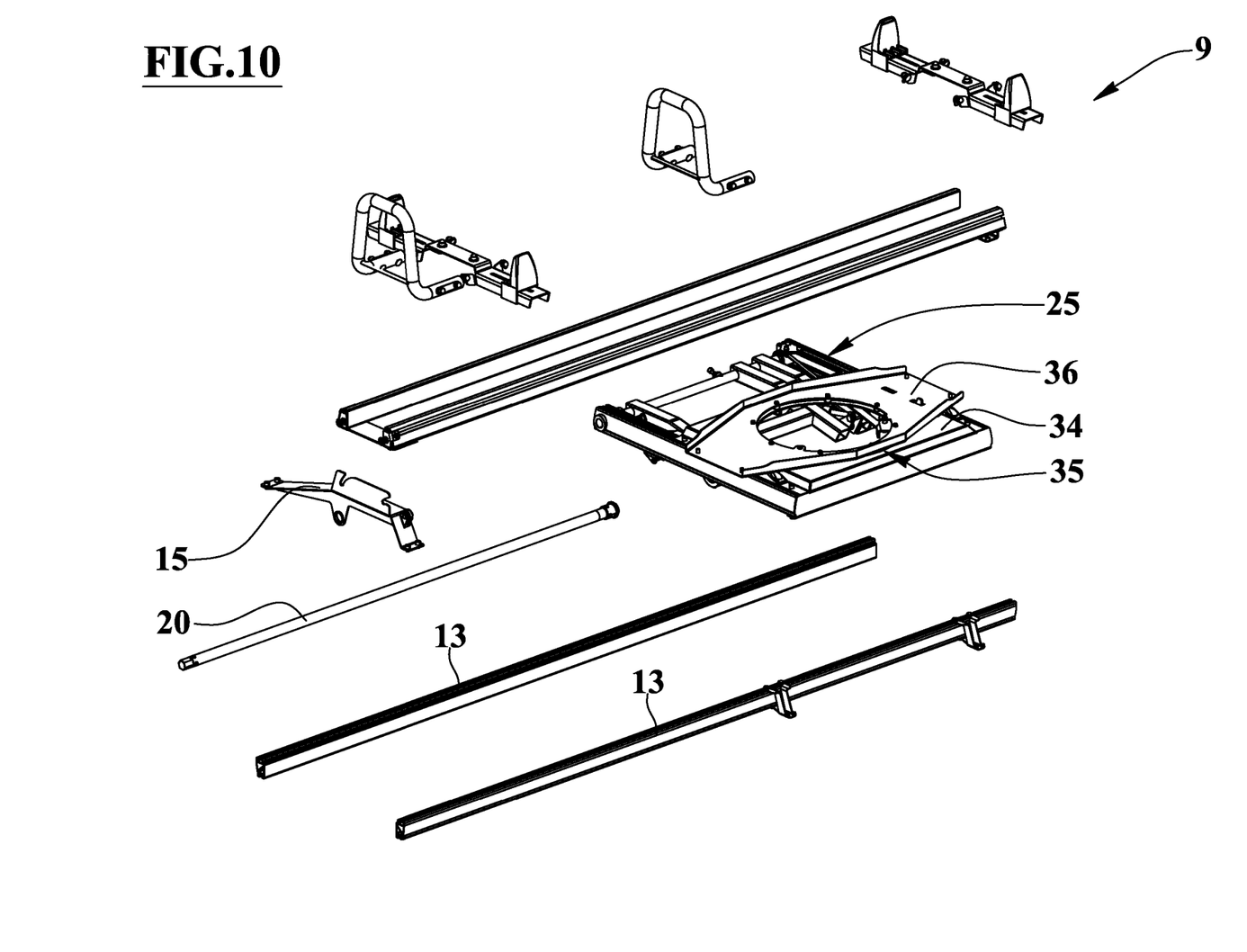
FIG. 10 illustrates a partially exploded view of FIG. 1.
Figure 11:
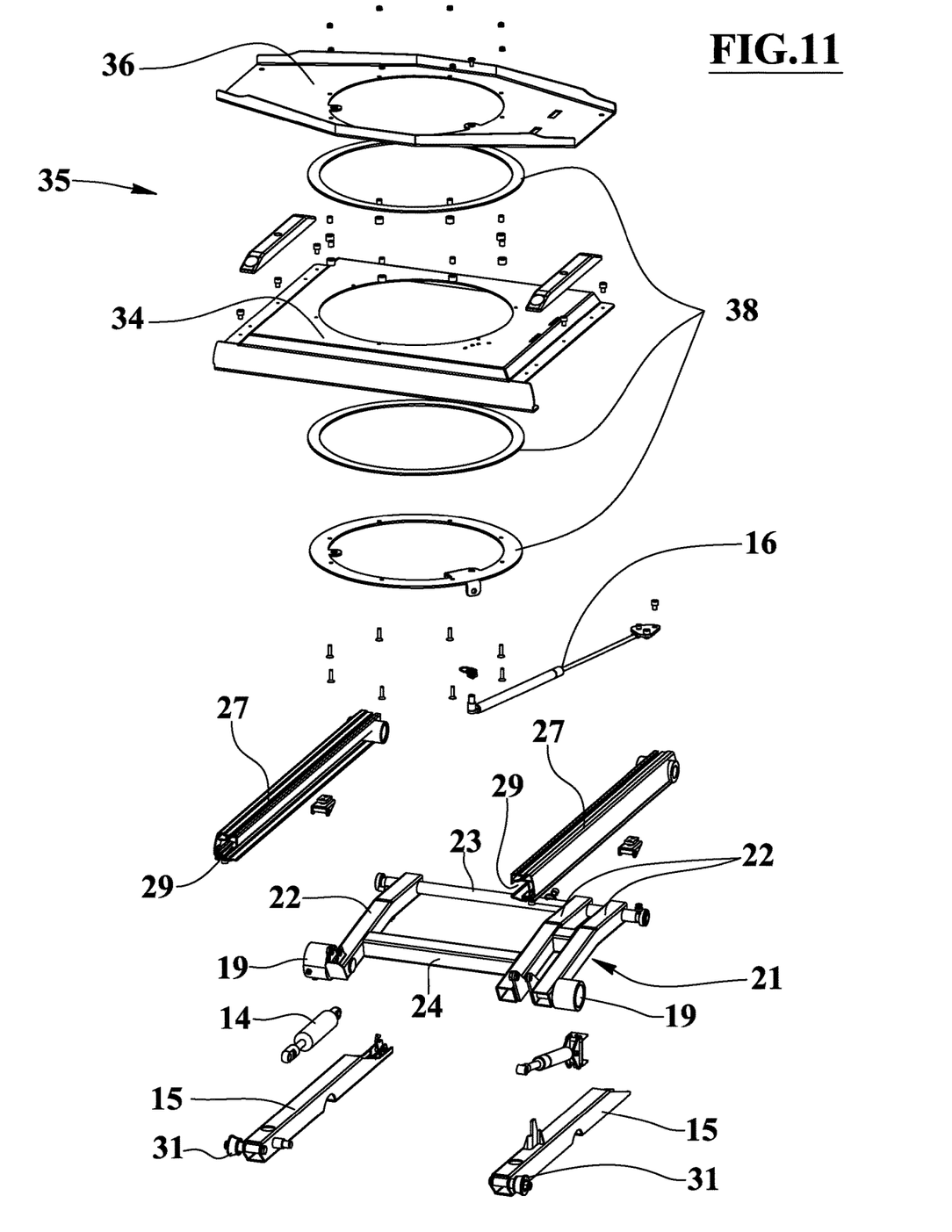
FIG. 11 illustrates an exploded view of an element of FIG. 10.
Figure 12:
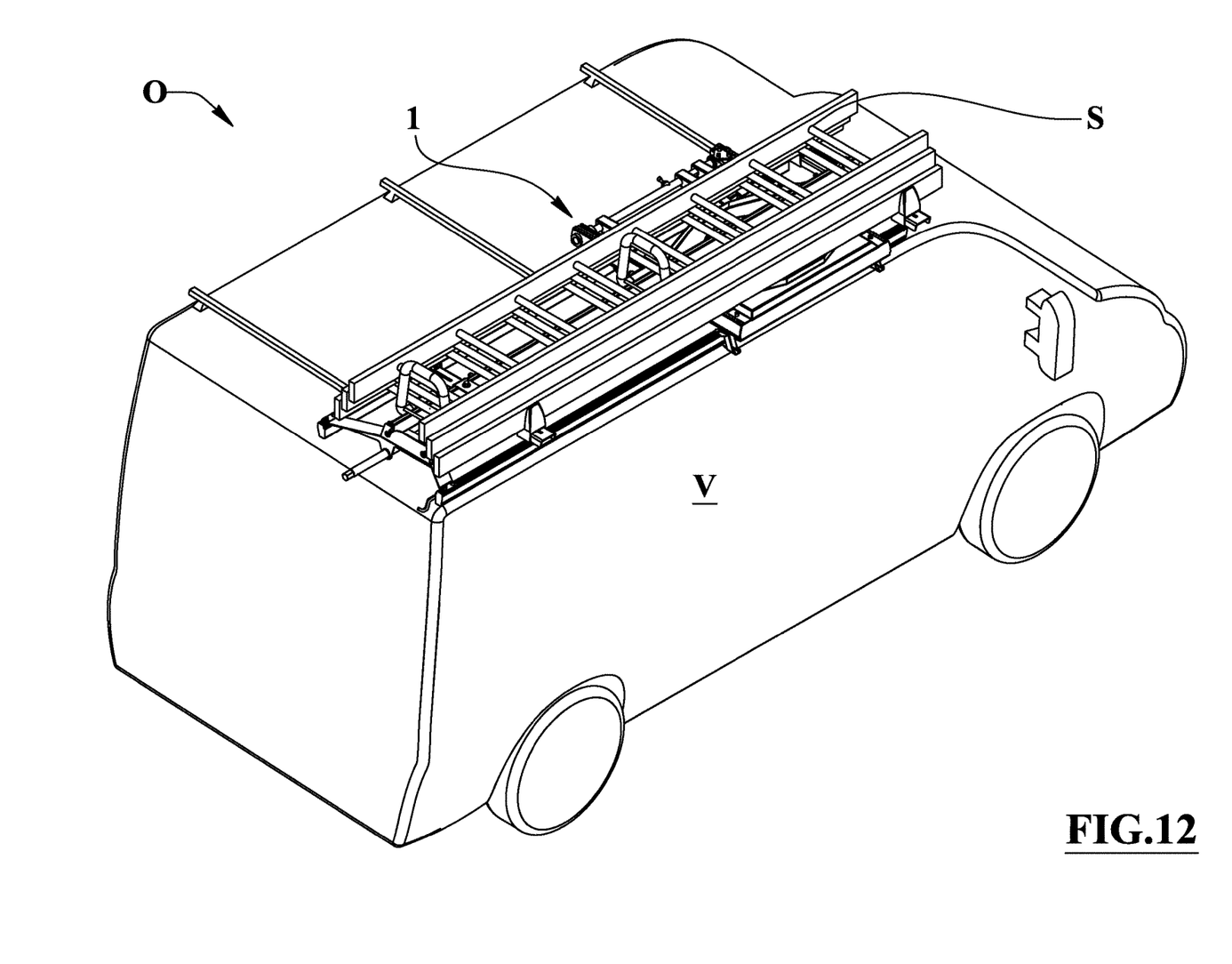
FIG. 12 illustrates a device according to the invention associated with the vehicle and the ladder in a condition of transport of the ladder on the vehicle.
Figure 13:
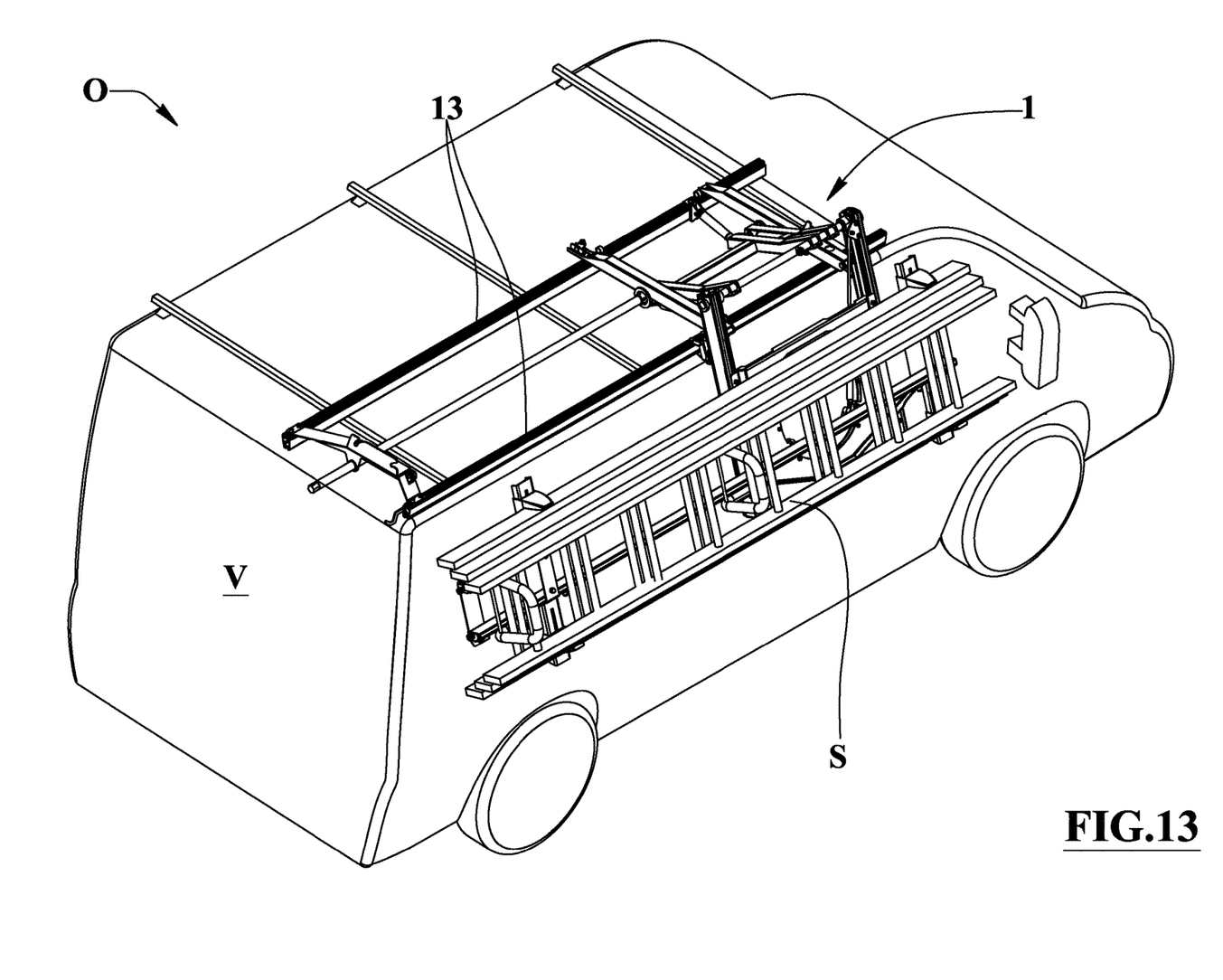
FIG. 13 illustrates the device of FIG. 12 in a condition of partial descent of the ladder from the vehicle.
Figure 14:
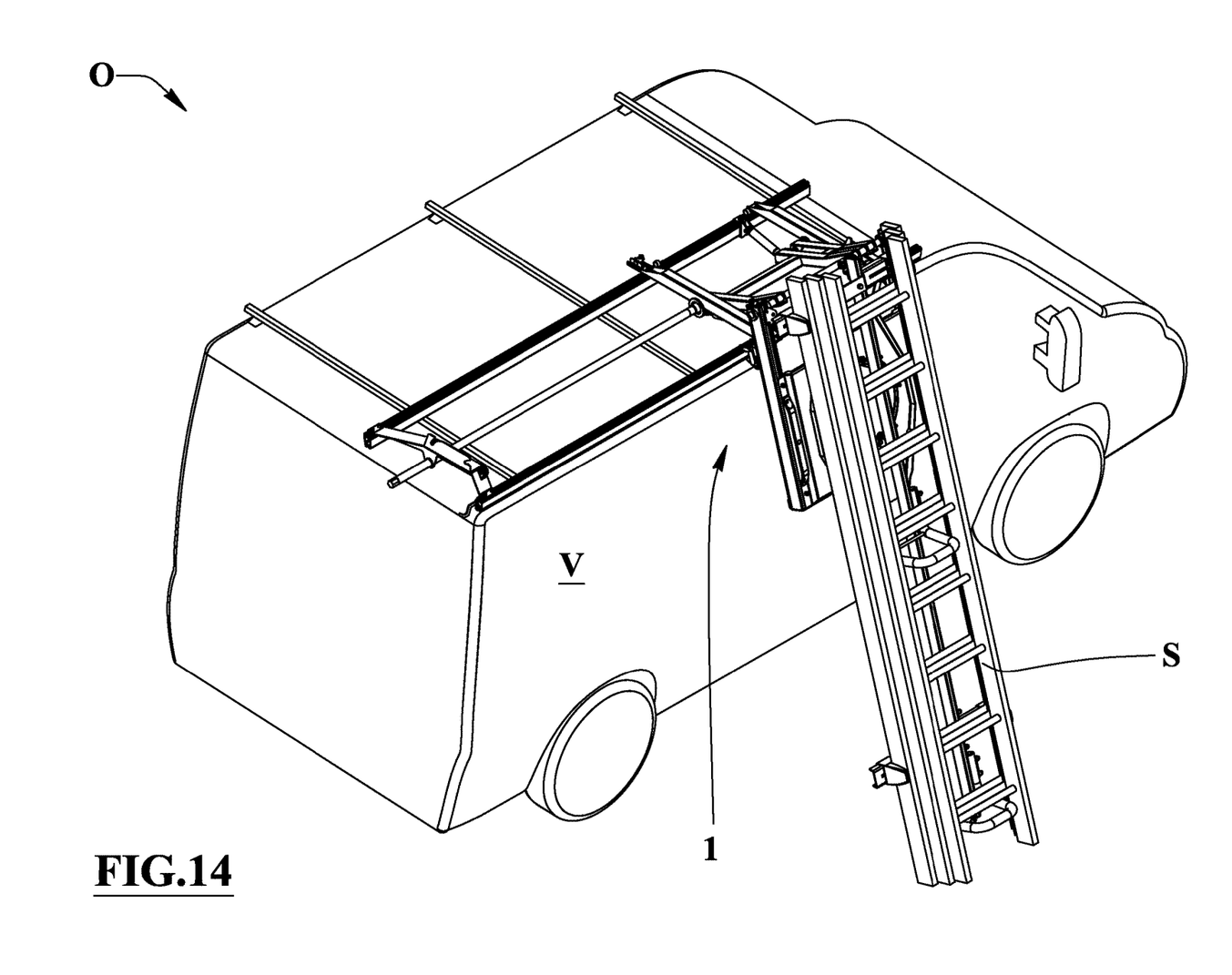
FIG. 14 illustrates the device of FIGS. 12 and 13 in a condition of removal or unloading of the ladder from the vehicle or commencement of storage of the ladder in the device or loading into the device in an opposite order, that is, in a reverse operation.

The ladder carrying device 1 for a vehicle, such as a truck, a car, a van, a trolley, a trailer or the like, is equipped with a frame element 3 assigned, in one of its operative conditions O to be fixed above the vehicle V, for example to the eaves of the vehicle roof by means of screw, clamp or transverse bar connections, as illustrated in FIGS. 12-14. In the case of pickups, caissons, trolleys and in general where a roof is missing, structures can be provided, for example upright or roll bar, for fixing the frame to the vehicle.

The frame element 3 is connected to a support member 9 for a ladder S or for more ladders.

The frame element 3 is provided with two elongated or profiled elements, for example consisting of tubular or box-like elements or profiles made of aluminium, other metal or composite materials.

Each of these elongated or profiled elements carries a respective longitudinal edge 13 which, in the operating condition, is higher. Such elements are mutually connected by at least one transversal element 15, preferably two or three as illustrated in the figures. The transversal elements 15 are fixed to the upper longitudinal edges 13 by means of welding, gluing, joints, rivets, nails or, preferably and as illustrated in the figures, by means of threaded elements, for example of the screw and bolt type.

Alternatively, the elongated or profiled elements carrying the respective longitudinal edges 13 are in a single body with the transversal elements 15 or the frame element 3 comprising a longitudinally elongated plate or cradle with the longitudinal edges 13 folded and/or turned upwards.

In any case, the longitudinal edges 13 are parallel, or nearly parallel, to one another and to a longitudinal axis of the vehicle V and are mutually rigidly connected.

A portion interposed between and distant from said longitudinal edge 13 of one transversal element 15 carries a seat for a longitudinal stationary pivot 19.

In a preferred alternative, and as shown in the figures, two (or more) portions interposed between and distant from said longitudinal edges 13 of two (or more) transversal elements 15 carry respective seats for a longitudinal stationary pivot 19 or preferably for respective longitudinal stationary cantilever pivots 19.

Such one or more longitudinal stationary pivots 19 are engaged in respective seats obtained in, or fixed to, a first end of a swinging body 21, whose opposite and second end is connected, by means of a longitudinal mobile pivot 23, to an oscillating element 25 connected to the support member 9.

Said swinging body 21 can be of the plate-like type, box-like or preferably of the type with shaped tubes having a quadrangular section and comprises at least two, preferably three, transversal beams 22, for example in steel or aluminium tube with a square section, shaped and mutually parallel.

At least two of these transversal beams 22 can be mutually connected by one or more longitudinal beams 24 of the same type.

At least the seats of the transversal elements 15 and/or of the first end of the swinging body 21 enable the rotation of the respective longitudinal stationary pivot 19 to allow the rotation of the swinging body 21 with respect to the frame element 3.

The invention also provides for the possibility of a single longitudinal stationary pivot 19 mounted in a respective seat obtained in, or fixed to, a single transversal element.

The distance between the seats of the transversal beams of the swinging body for the longitudinal stationary pivot or pivots 19 and the seats for the longitudinal mobile pivot 23 is greater than half the mutual distance between the longitudinal edges 13 of the two elongated or profiled elements of the frame element 3 so that, at least following the rotation of the swinging body 21 for moving the ladder, this latter swinging body 21 protrudes from the frame element 3 beyond one of the longitudinal edges 13.

The longitudinal mobile pivot 23 can be in distinct and aligned elements or and preferably in a single body as illustrated in the figures.

The oscillating element 25 preferably comprises two transversely oriented mobile beam elements 27; one end of each of them 27 carries a seat for the longitudinal mobile pivot 23 where this pivot 23 is connected in such a way as to allow the rotation of the oscillating element 25 with respect to the swinging body 21.

The mobile beam elements 27 can be of the same type as the elongated or profiled elements carrying the respective longitudinal edges 13 and preferably consist of extruded profiles of aluminium or its alloys.

Each mobile beam 27 has a respective guide member 29, disposed parallel to the longitudinal extension of the mobile beam 27 itself, and assigned for the translation along it 29 of at least one mobile member 31 fixed to a longitudinal edge 13 or preferably to one end of a transversal element 15.

The support member 9 for a ladder S can be connected to the oscillating element 25 directly or, preferably by means of a rotation element 35, as illustrated in the figures, having a mobile and transversal rotation axis, and interconnected between the oscillating element 25 and the support member 9 to allow rotation of the support member 9 with respect to the oscillating element 25 around said respective mobile rotation axis.

Alternatively, the oscillating element 25 can comprise three or more mobile beam elements 27 or can comprise a single plate-like and/or box-like mobile beam element 27 whose transversal sides carry respective guide members 29.

In any case, the longitudinal openings of the guide members 29 for the sliding of the mobile members 31 are obtained in the mutually facing surfaces of the guide members 29 where said surfaces or faces are lateral and longitudinal with respect to the geometric extension of said guide members 29.

Each mobile member 31 is preferably of the rolling type, for example with roller, ball bearing or bushing, with rotation axis longitudinal with respect to the vehicle.

Each mobile member 31 is preferably fixed to one end, protruding from the respective longitudinal edge 13, of a corresponding transversal element 15.

The rotation element 35 comprises a first plate shaped body 34 fixed to the two mobile beam elements 27 and centrally fixed to an annular rotation means 38 rotatably supporting a second plate shaped body 36 of the support member 9 for the ladder S in a way to allow the rotation of the latter around the rotation axis of the annular rotation means 38.

The at least one longitudinal stationary pivot 19 is coaxially fixed to a rotation shaft 20 of the swinging body 21 which can be operated manually by means of a tool or is of the motorized type.

The swinging body 21 can be connected to one of the longitudinal edges 13 by means of a first resilient element 14, such as a gas spring, assigned to facilitate the rotation of the swinging body 21; a further gas spring, having the same function, can be connected between a part of the frame element 3, for example a transversal element 15, and one of the transversal beams 22 of the swinging body 21.

The second plate shaped body 36 can be connected to one of the mobile beam elements 27 by means of a second resilient element 16, such as a gas spring, assigned to facilitate the rotation of the second plate shaped body 36 itself.

The device 1 can also comprise a first removable lock means 26 interconnected between the swinging body 21 and the frame element 3 and operable manually or by means of an electric actuator to lock or unlock the rotation of the swinging body 21 and/or the device 1. It can comprise a second removable lock means 28 interconnected between the support member 9 and the oscillating element 25 and operable manually or by means of an electric actuator to lock or unlock the rotation of the support member 9.

The actuators for any motorization of the rotations and drives of the lock means can be controlled in a coordinated and programmable way by a control system, for example of the programmable digital type, of the device 1.

The frame element 3 and the oscillating element 25 can be equipped one with an abutment means and the other with a matching means assigned to create a stop means 32. Upon mutual contact between the abutment and matching means of the stop means 32, which occurs at the end of the movement of the oscillating element 25 for loading and unloading of the ladder, the further and excessive rotation is blocked and a solid support is provided by the stop means for the weight of the ladder during its loading and unloading operations.

The operativity of the device installed on the roof of a truck or other vehicle makes it possible to pick up the ladder in two phases, the first one of translation of the ladder parallel to itself from the roof to one side of the truck, and a second rotation phase bringing the longitudinal axis of the ladder from horizontal to vertical allowing the operator to easily pick up the ladder itself; to put the ladder back on the roof, the operator performs the same operations but in the opposite order, thus the device minimizes the efforts and risks for the operator.

The invention claimed is:

1. A ladder carrying device (1) for a vehicle, said device comprising a frame element (3) configured, in its operative condition (O), to be fixed onto the vehicle (V), said frame element (3) connected to a support member (9) for at least one ladder (S); the frame element (3) provided with at least two longitudinal edges (13) substantially parallel to a longitudinal axis of the vehicle (V) and mutually and rigidly connected by at least one transversal element (15); a median portion of said at least one transversal element (15) interposed between, and distant from, said longitudinal edges (13) and said median portion has at least one longitudinal stationary pivot (19) connected to a first end of a swinging body (21) whose opposite and second end connected, by means of at least one longitudinal mobile pivot (23) to an oscillating element (25) connected to the support member (9); said device further comprising at least one rotation element (35) having a mobile and transversal rotation axis, and interconnected between the oscillating element (25) and the support member (9) for the at least one ladder (S) and configured for rotation of the support member (9) with respect to the oscillating element (25) that comprises two parallel and spaced mobile beam elements (27) carrying respective guide members (29) formed as part of, or fixed to mutually facing longitudinal sides of the two mobile beam elements (27), said rotation element (35) comprising a first plate shaped body (34) fixed to the two mobile beam elements (27) and centrally fixed to an annular rotation means (38) rotatably supporting a second plate shaped body (36) of the support member (9).

2. The device according to claim 1, wherein the respective guide members (29) of the mobile beam elements (27) are configured for translation along them of a respective at least one mobile member (31) fixed to a longitudinal edge (13) or to one end of a respective transversal element (15) where the mobile beam elements (27) are transversely oriented.

3. The device according to claim 1, wherein the frame element (3) comprises two elongated or profiled bar elements, each carrying a respective longitudinal edge (13) and mutually connected by at least two transversal elements (15) each carrying a respective or a common longitudinal stationary pivot (19) where the elongated or profiled bar elements carrying the respective longitudinal edges (13) are fixed to the transversal elements (15) or are in a single body with them.

4. The device according to claim 1, wherein said swinging body (21), comprising at least two parallel transversal beams (22) mutually connected by one or more longitudinal beams (24) where the distance between the connections of the transversal beams of the swinging body (21) with the least one longitudinal stationary pivot (19) and with the respective least one longitudinal mobile pivot (23), is greater than half the mutual distance between the longitudinal edges (13) of the two elongated or profiled bar elements of the frame element (3); where the longitudinal mobile pivot (23) can be in a single body or in distinct and aligned elements.

5. The device according to claim 2, wherein each mobile member (31) is of the type comprising a roller with a longitudinal rotation axis and each mobile member (31) is fixed at one end, protruding from the respective longitudinal edge (13), of a corresponding transversal element (15).

6. The device according to claim 1, wherein the at least one longitudinal stationary pivot (19), fixed and coaxial to a rotation shaft (20) for the swinging body (21), is operable manually by means of a tool engageable to said rotation shaft (20) or by means of a motor; said swinging body (21) connected to one of the longitudinal edges (13) by means of a first resilient element (14) configured to facilitate the rotation of the swinging body (21).

7. The device according to claim 1, wherein the second plate shaped body (36) is connected to one of the mobile beam elements (27) by means of a second resilient element (16) configured to facilitate the rotation of the second plate shaped body (36).

8. The device according to claim 1, further comprising a first removable lock means (26) interconnected between the swinging body (21) and the frame element (3) wherein the removable lock means (26) is operable manually or by means of an electric actuator to lock or unlock the rotation of the swinging body (21).

9. The device of claim 8, further comprising a second removable lock means (28) interconnected between the support member (9) and the oscillating element (25) that (28) is operable manually or by means of an electric actuator to lock or unlock the support member (9) rotation.

10. The device of claim 1, further comprising a removable lock means (28) interconnected between the support member (9) and the oscillating element (25) that (28) is operatable manually or by means of an electric actuator to lock or unlock the support member (9) rotation.

* * * * *